(12) United States Patent
Schneider et al.

(10) Patent No.: US 11,535,191 B2
(45) Date of Patent: Dec. 27, 2022

(54) SEATBELT ASSEMBLY WITH ENHANCED SHOULDER BELT POSITIONING

(71) Applicant: AUTOLIV ASP, INC., Ogden, UT (US)

(72) Inventors: David W. Schneider, Waterford, MI (US); Bin Wang, Lake Orion, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 75 days.

(21) Appl. No.: 16/662,115

(22) Filed: Oct. 24, 2019

(65) Prior Publication Data
US 2021/0122326 A1  Apr. 29, 2021

(51) Int. Cl.
| | | |
|---|---|---|
| *B60R 22/28* | (2006.01) | |
| *B60R 22/20* | (2006.01) | |
| *B60R 22/16* | (2006.01) | |
| *B60R 22/18* | (2006.01) | |

(52) U.S. Cl.
CPC .............. *B60R 22/28* (2013.01); *B60R 22/16* (2013.01); *B60R 22/20* (2013.01); *B60R 2022/1806* (2013.01); *B60R 2022/283* (2013.01)

(58) Field of Classification Search
CPC ... B60R 22/12; B60R 22/30; B60R 2022/008; B60R 22/28; B60R 22/16; B60R 22/20; B60R 22/023; B60R 2022/1806; B60R 2022/283
See application file for complete search history.

(56) References Cited

U.S. PATENT DOCUMENTS

| | | | |
|---|---|---|---|
| 4,146,268 A * | 3/1979 | Bost ....................... | B60R 22/30 |
| | | | 297/475 |
| D393,337 S * | 4/1998 | Seki .............................. | D2/624 |
| 5,902,015 A | 5/1999 | Allcock | |
| 6,343,841 B1 | 2/2002 | Gregg et al. | |
| 6,485,058 B1 | 11/2002 | Kohlndorfer et al. | |
| 6,969,088 B2 | 11/2005 | Wang | |
| 8,336,663 B2 * | 12/2012 | Schramm .............. | B60R 22/321 |
| | | | 180/268 |
| 2011/0101765 A1 * | 5/2011 | Brents ..................... | B60R 22/12 |
| | | | 297/483 |

(Continued)

FOREIGN PATENT DOCUMENTS

| | | | | |
|---|---|---|---|---|
| AU | 2008100191 A4 * | 4/2008 | ........... | B60R 22/105 |
| CN | 101580050 A * | 11/2009 | ............. | B60R 22/20 |

(Continued)

*Primary Examiner* — James A English
*Assistant Examiner* — Scott F. Underwood
(74) *Attorney, Agent, or Firm* — Dickinson Wright PLLC

(57) ABSTRACT

Seatbelt assemblies for motor vehicle occupant restraint providing enhanced frontal impact restraint characteristics. Embodiments illustrated a displacement of the intersection positioned between the lap and shoulder belt portions of an active three-point type belt system. In one set of embodiments particularly useful with dual retractor systems, adaptive positioning provisions allow the point of intersection to initially occur at or near the seatbelt latch plate and when a restraint load occurs components release to allow repositioning of the intersection. In other embodiments best implemented in single retractor systems, a turning loop is provided which displaces the webbing slot separating the lap and shoulder belt sections from the buckle latch plate.

12 Claims, 13 Drawing Sheets

(56) References Cited

U.S. PATENT DOCUMENTS

2012/0112516 A1* 5/2012 Roman .................. B60R 22/30
                                                                    297/483
2017/0327076 A1* 11/2017 Bennett .................. B60R 22/18

FOREIGN PATENT DOCUMENTS

| DE | 10 2016 211 409 A1 | 12/2017 | |
|----|--------------------|---------|---|
| EP | 0 380 442 B1 | 5/1995 | |
| FR | 2271847 A1 * | 12/1975 | ......... A44B 11/2538 |
| KR | 960007728 Y1 * | 9/1996 | |

\* cited by examiner

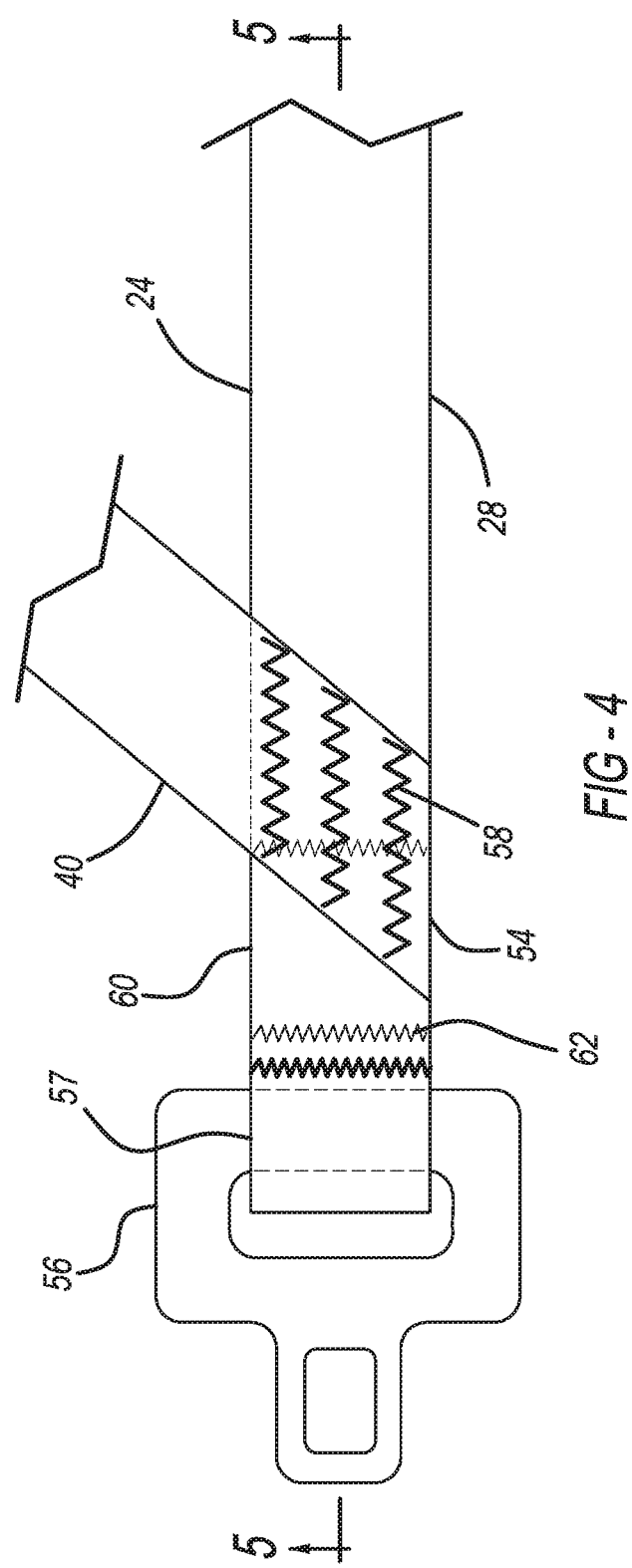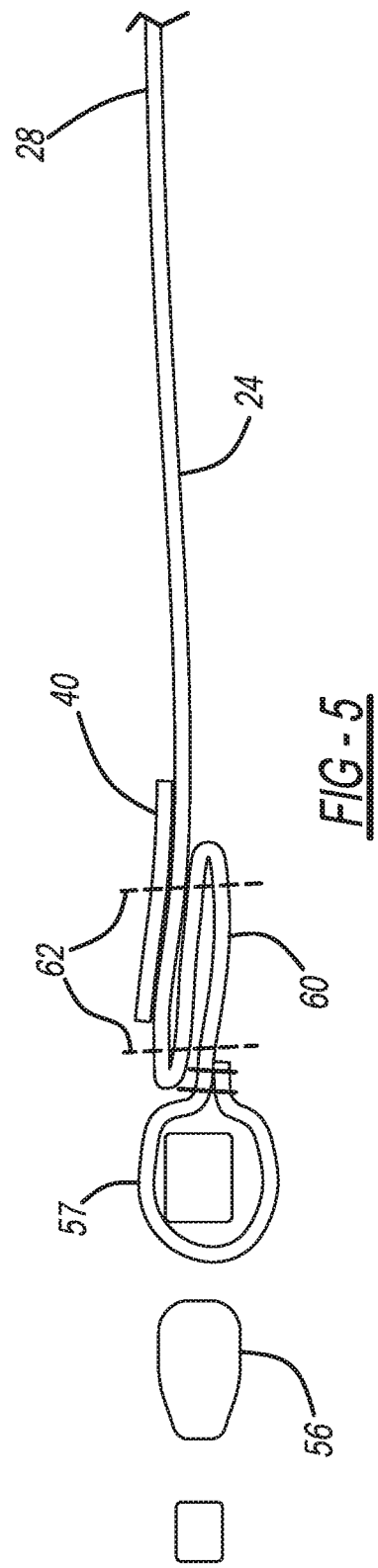

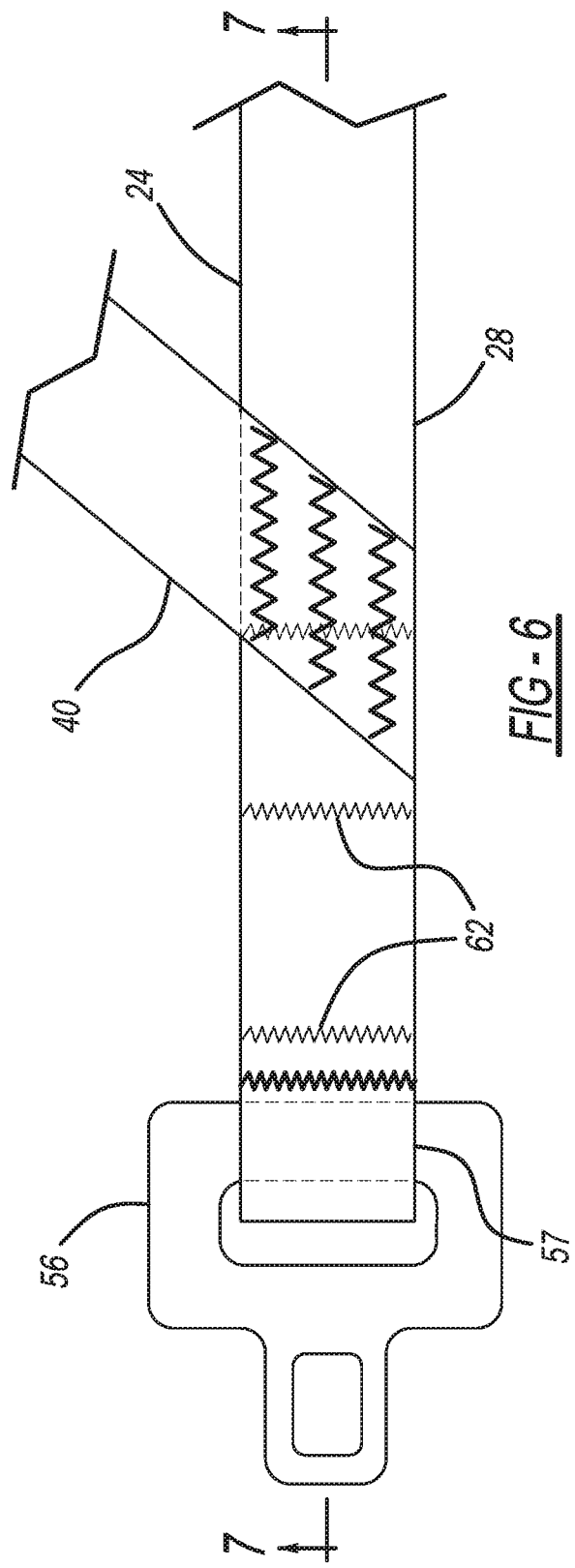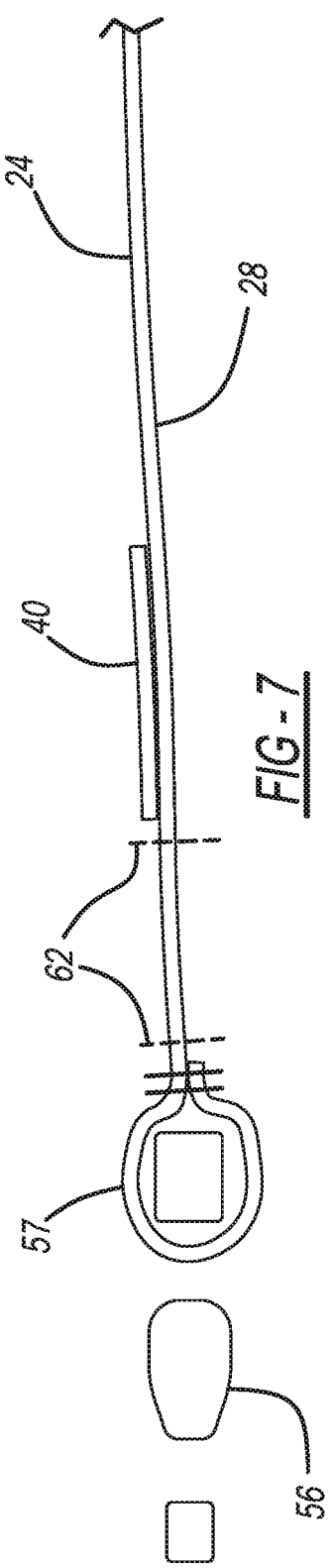

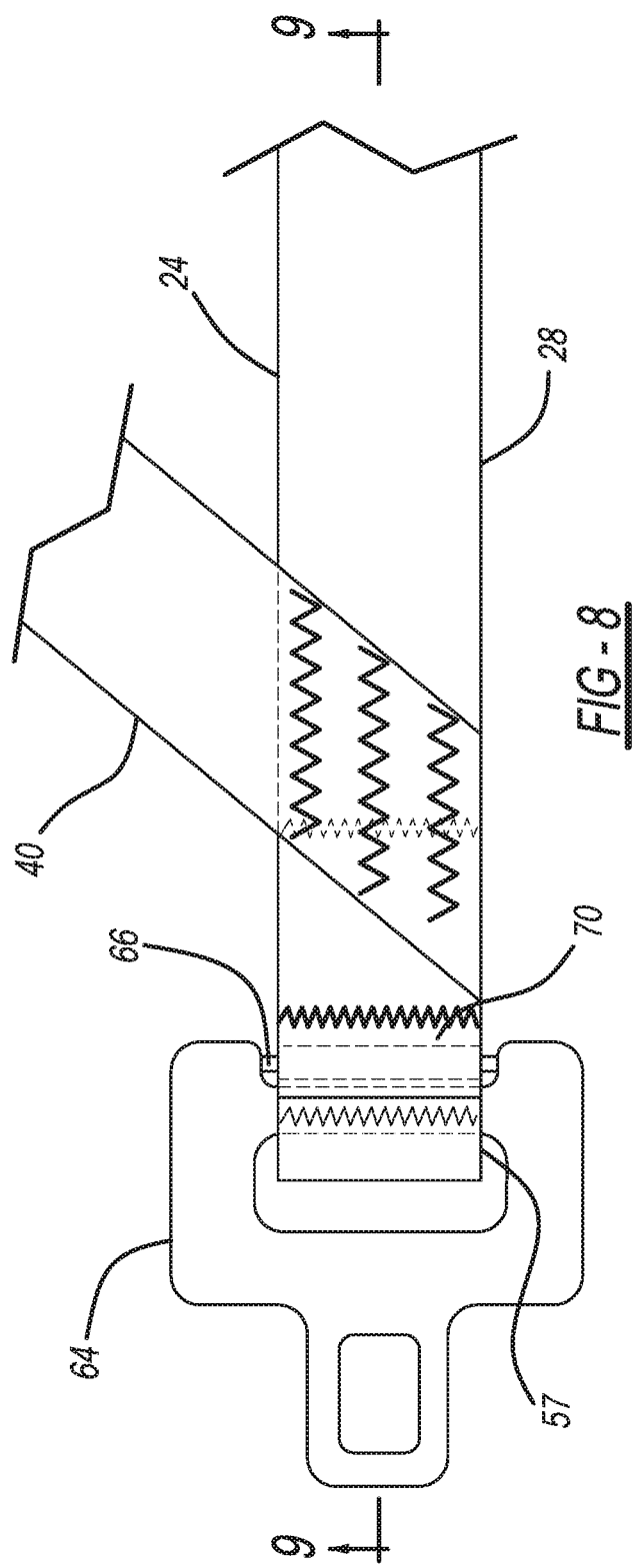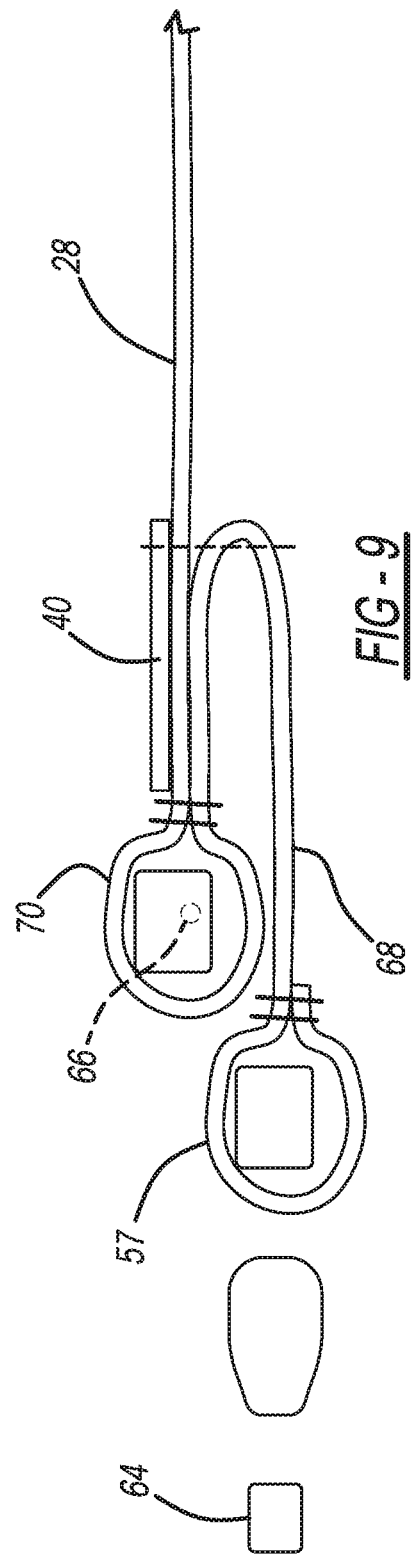

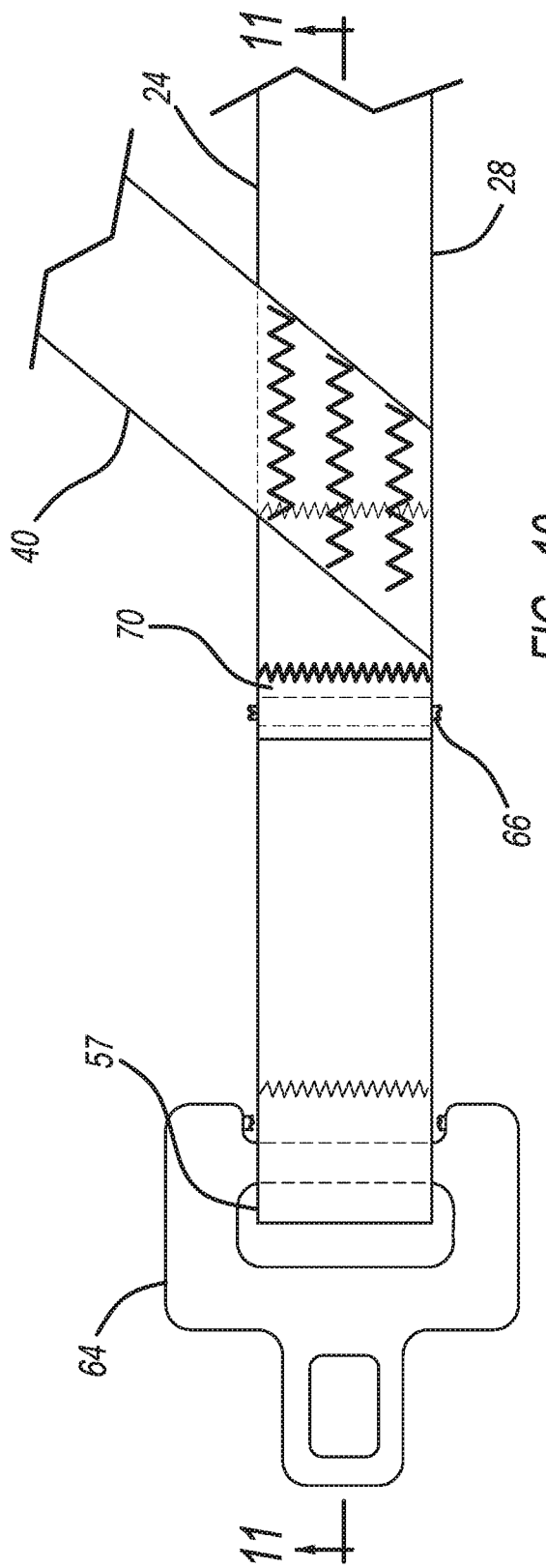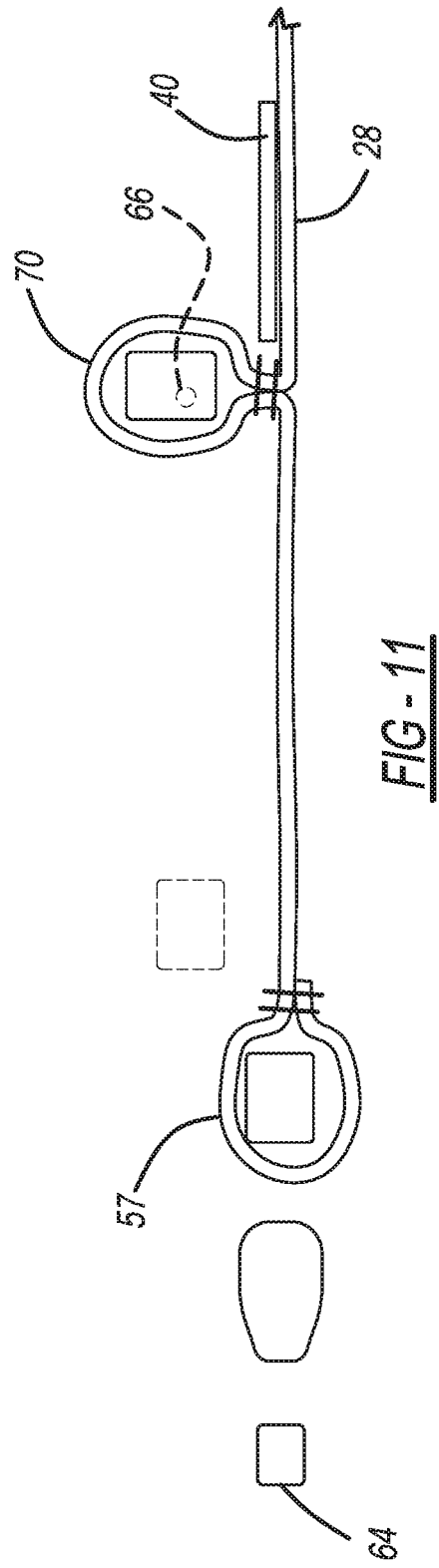

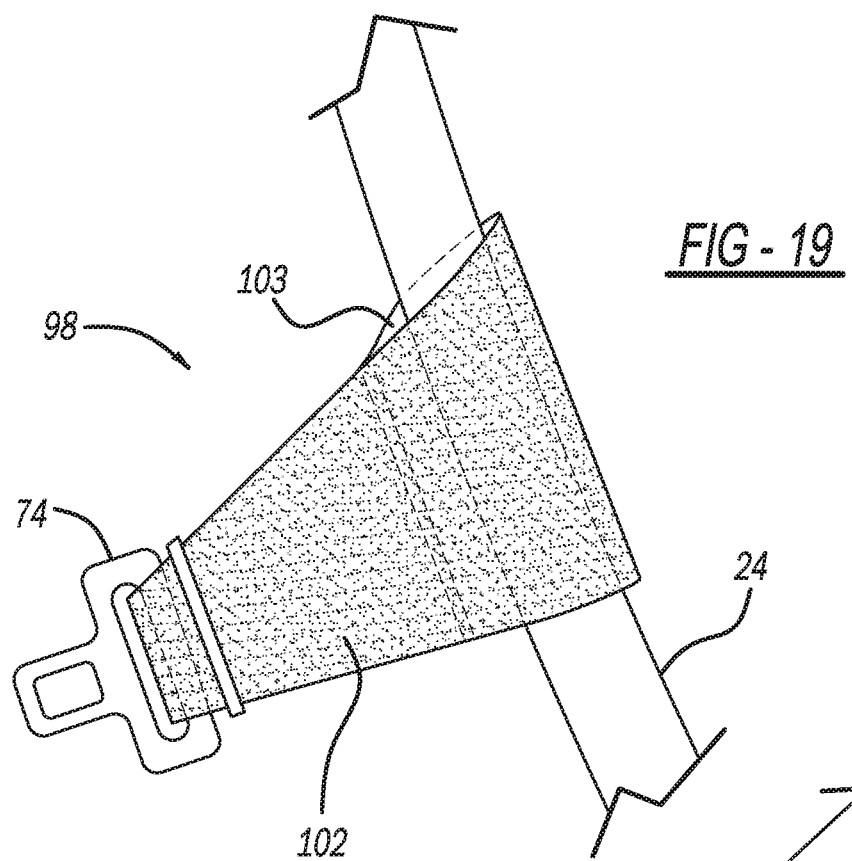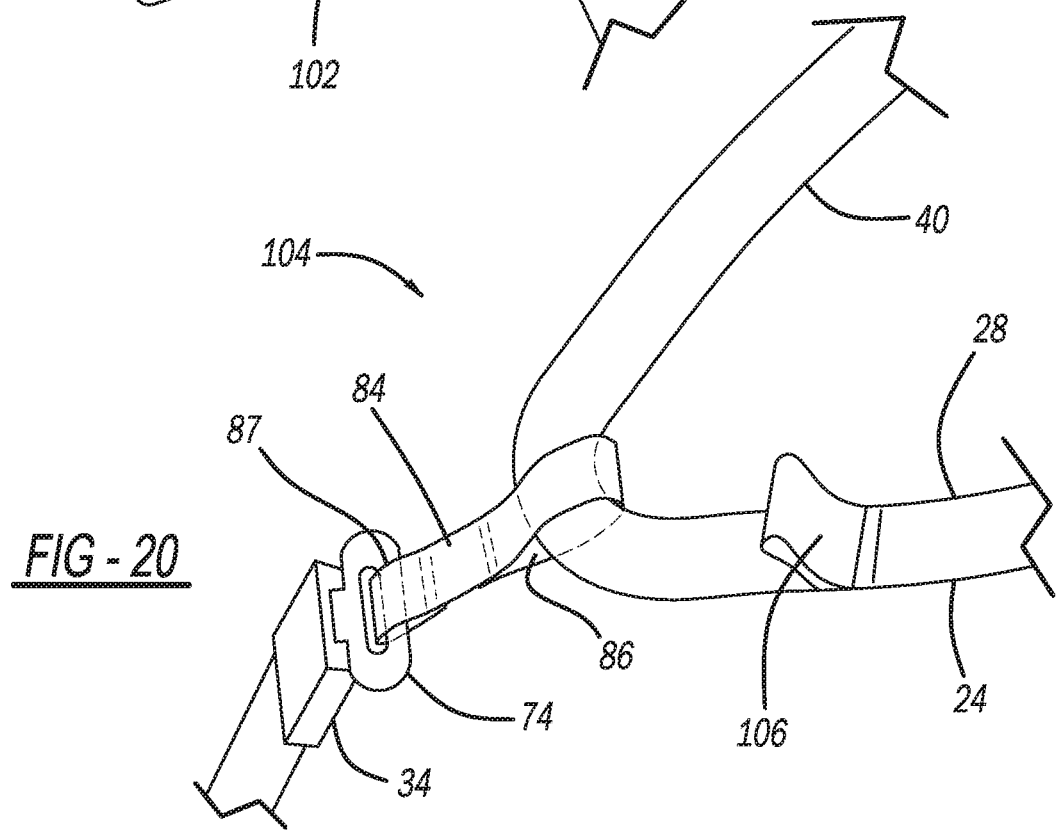

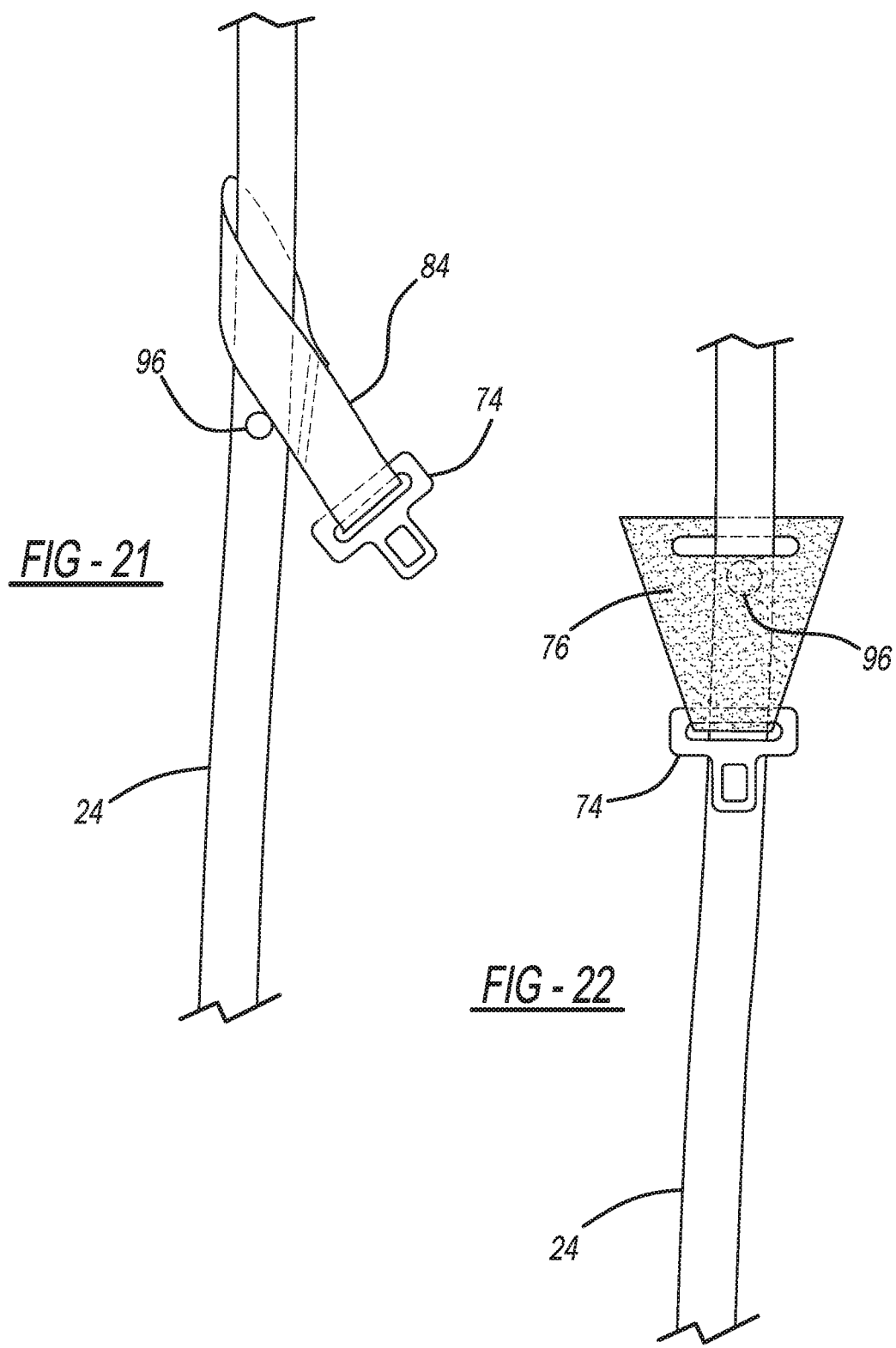

SEATBELT ASSEMBLY WITH ENHANCED SHOULDER BELT POSITIONING

FIELD OF THE INVENTION

This invention relates to a motor vehicle three-point type seatbelt system having improvements related to the positioning of the shoulder belt section of the seatbelt assembly intended to provide enhanced occupant restraint capabilities.

BACKGROUND

Active type seatbelt restraint systems for passenger car motor vehicles are in widespread use and are proven systems for providing occupant restraint upon the occurrence of a vehicle impact or rollover event. Active seatbelt restraint systems operate with passive restraint systems including frontal impact airbags, side airbags, side curtain airbags and other passive restraint systems. Despite the high level of performance of these systems, vehicle manufacturers and suppliers of safety related components constantly strive to enhance occupant protection. Typical three-point type active seatbelt systems use a low mounted vehicle or seat connected anchorage fastened at one end of a seatbelt webbing. A lower lap belt section of the webbing extends across the lap area of the occupant and normally connects with an actively engageable and releasable seatbelt buckle, which is in turn mounted to the vehicle body structure or seat frame at an opposite side of the seat from the first anchorage. A shoulder belt section extends from the seatbelt latch plate to an upper anchorage. Single retractor and dual retractor systems are used. In a single retractor system, the retractor is connected with the upper end of the belt with the retractor either mounted at a high position or the webbing is routed through a guide loop with the retractor mounted at a lower position in the vehicle body. The latch plate which is connectable with a buckle slides along the webbing so that the lengths of the shoulder belt and lap belt sections can be varied to suit the occupant's stature and seat position. In a dual retractor system, the webbing is normally fixed to the latch plate and a dedicated lap belt section extends to a lower mounted first retractor with the second retractor mounted at the upper end of the shoulder belt section, or mounted at a lower position with the webbing routed through a high mounted turning loop.

In prior art systems, the intersection between the lap belt and shoulder belt sections occurs at near the position of the latch plate, both in the case of single and dual retractor systems. This places the shoulder belt at a particular orientation relative to the occupant's upper torso. Ideally, the lap belt section engages the occupant's pelvis at the anterior superior iliac spine (ASIS), whereas the upper end of the shoulder belt section restrains the occupant at the clavicle. Also ideally, the lower end of the shoulder belt section engages the ASIS. Due to the attachment location between the shoulder and lap belt sections, the shoulder belt crosses the chest diagonally, often without engaging the occupant's ASIS at the lower end. As the occupant translates and rotates forward in a vehicle impact, a high shoulder belt force may be applied across the chest, with potentially excess force applied to the ribs and/or internal organs of the occupant. The positioning of the intersection between the lap and shoulder belt sections is subject to regulatory requirements including US Federal Motor Vehicle Safety Standard (FMVSS) 208 regulation which require that the lateral separation between the shoulder belt/lap belt intersection and the centerline of the occupant surrogate be at least 6 inches. In view of these parameters there is a need for improved seatbelt restraint systems offering enhanced coupling between the shoulder belt section and the ASIS of an occupant.

There are examples in the prior art of efforts to provide enhanced positioning of the shoulder belt relative to the occupants pelvis. For example, as described by reference DE 10 2016 211 409, the lower end of the shoulder belt can be fixedly attached to the lap belt at a position displaced from the buckle latch plate. Although this would reposition the shoulder belt in a desired manner this solution may not meet FMVSS requirements as outlined above.

SUMMARY

In view of the above background and desired improvements over prior art designs, several embodiments of the present invention provide solutions. In a first group of embodiments especially oriented toward application with dual retractor systems, an adaptive positioning feature is provided. For this group of embodiments, in normal usage, the intersection between the shoulder and lap belt sections occurs directly adjacent to the buckle assembly, as with typical prior art systems. However, under a restraint load resulting from belt tension caused by operation of a belt pretensioner or engagement with the belt system by the occupant, a portion of the lap belt unfolds and extends to reposition the junction between the lap and shoulder belt sections to a position displaced toward the occupant centerline. This approach meets FMVSS static requirements while providing enhanced dynamic restraint performance. Several embodiments are described having various mechanisms to permit a tension-responsive repositioning of the shoulder belt webbing.

A second group of embodiments in accordance with the present invention are oriented toward use with single retractor systems. In these embodiments, a turning loop is provided which extends the intersection between the lap and shoulder belt from the buckle assembly. The turning loop allows free passage of the belt webbing so the shoulder belt and lap belt sections can have variable lengths, as required for single retractor systems. The turning loop is formed of a pliable or flexible material which provides for occupant comfort. Since the intersection position of the lap/shoulder belt sections does not change in these embodiments, it will be necessary to provide compliance with the FMVSS requirements outlined previously, but the minimum distance positioning can be achieved even where the buckle is positioned further outboard relative to the occupant due, for example, in meeting vehicle design and packaging requirements, dimensional factors and occupant comfort and convenience parameters.

While the above description constitutes the preferred embodiment of the present invention, it will be appreciated that the invention is susceptible to modification, variation and change without departing from the proper scope and fair meaning of the accompanying claims.

BRIEF DESCRIPTION OF THE DRAWINGS

FIG. 4 is an enlarged cutaway view of the seatbelt assembly shown in FIG. 3 showing the seatbelt buckle area and the connection between the shoulder belt and lap belt webbing before deployment of a first embodiment of an adaptive positioning feature.

FIG. 5 is a cross-sectional view taken along line 5-5 from FIG. 4.

FIG. 6 is an enlarged cutaway view of the seatbelt assembly shown in FIG. 3 showing the seatbelt buckle area and the connection between the shoulder belt and lap belt webbing following deployment of the first embodiment of an adaptive positioning feature.

FIG. 7 is a cross-sectional view taken along line 7-7 from FIG. 6.

FIG. 8 is an enlarged cutaway view of the seatbelt assembly shown in FIG. 3 showing the seatbelt buckle area and the connection between the shoulder belt and lap belt webbing before deployment of a second embodiment of an adaptive positioning feature.

FIG. 9 is a cross-sectional view taken along line 9-9 from FIG. 8.

FIG. 10 is an enlarged cutaway view of the seatbelt assembly shown in FIG. 3 showing the seatbelt buckle area and the connection between the shoulder belt and lap belt webbing following deployment of a second embodiment of an adaptive positioning feature.

FIG. 11 is a cross-sectional view taken along line 11-11 from FIG. 10.

FIG. 19 is a partial pictorial view of a turning loop in accordance with an eighth embodiment of the present invention.

FIG. 20 is a partial pictorial view of a turning loop in accordance with a ninth embodiment of the present invention.

FIG. 21 is a partial pictorial view of a turning loop shown in FIG. 15 in a stowed condition.

FIG. 22 is a partial pictorial view of a turning loop shown in FIG. 12 in a stowed condition.

DETAILED DESCRIPTION

Figure 1:
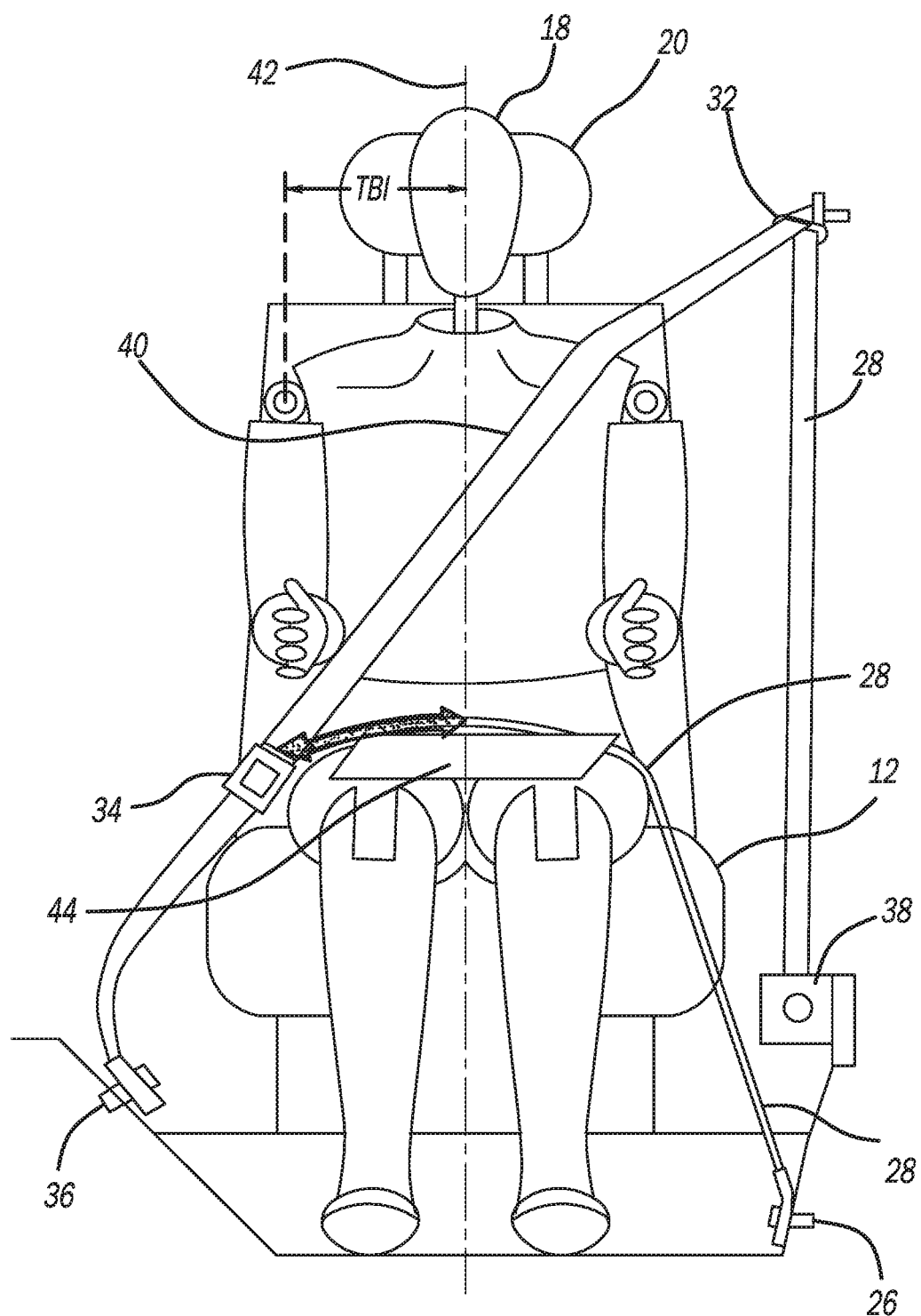
FIG. 1 is a front view of a driver side front seat occupant dummy positioned in a vehicle seat with a fastened three point active restraint system in accordance with the prior art.

FIG. 1 provides a generalized illustration of an occupant 10 in the form of an anthropomorphic test dummy (ATD) seated in a representative motor vehicle seat 12 having seat cushion 14 and seat back 16. The occupant's head 18 is supported by head restraint 20. Seatbelt assembly 22 includes seatbelt webbing 24, in this case formed of a single continuous length of woven fabric material. One end of webbing 24 is securely fixed to lower outboard anchorage 26. A first portion of webbing 24 defines lap belt portion 28 which extends and wraps through buckle latch plate 30 (shown in FIG. 4) and then extends in a diagonal direction across occupant 10 which defines shoulder belt portion 40, to upper D ring or guide loop 32. Buckle assembly 34 is mounted to a short length of webbing or an extending metal strap fixed to inboard anchorage 36. An opposite end of webbing 24 is affixed to locking retractor 38 which allows extension and retraction of the webbing. Locking retractor 38 may provide a number of well-known performance features and functions such as load limiting and pretensioning. Pretensioning may be provided using a retractor roto-pretensioner or other retractor pretensioner which, when activated in the event of a detected impact, retracts a portion of webbing 24 to decrease slack in the belt system and increase webbing tension. A pretensioning function may also be provided by other well-known mechanisms including devices acting at the seatbelt anchorages or specifically on buckle assembly 34. The system illustrated in FIG. 1 is a typical single retractor system shown here with the seatbelt assembly 22 in a fastened or donned condition. Since webbing 24 can freely flow through buckle latch plate 30, the lengths of lap belt portion 28 and shoulder belt portion 40 can be adjusted to suit the occupant's characteristics and adjusted seat position.

FIG. 1 designates vertically extending center line 42 defined as a vertical longitudinal plane (relative to the associated vehicle) extending through the lateral center of occupant 10. FIG. 1 also illustrates plate 44 placed on the occupant's upper legs used as part of a compliance test for FMVSS 208. The lateral separation between centerline 42 and the position of buckle assembly 34 is defined by the previously noted safety standard as being at least 6 inches. FIG. 1 provides a general description of embodiments of the present invention which are described as follows.

Figure 2:
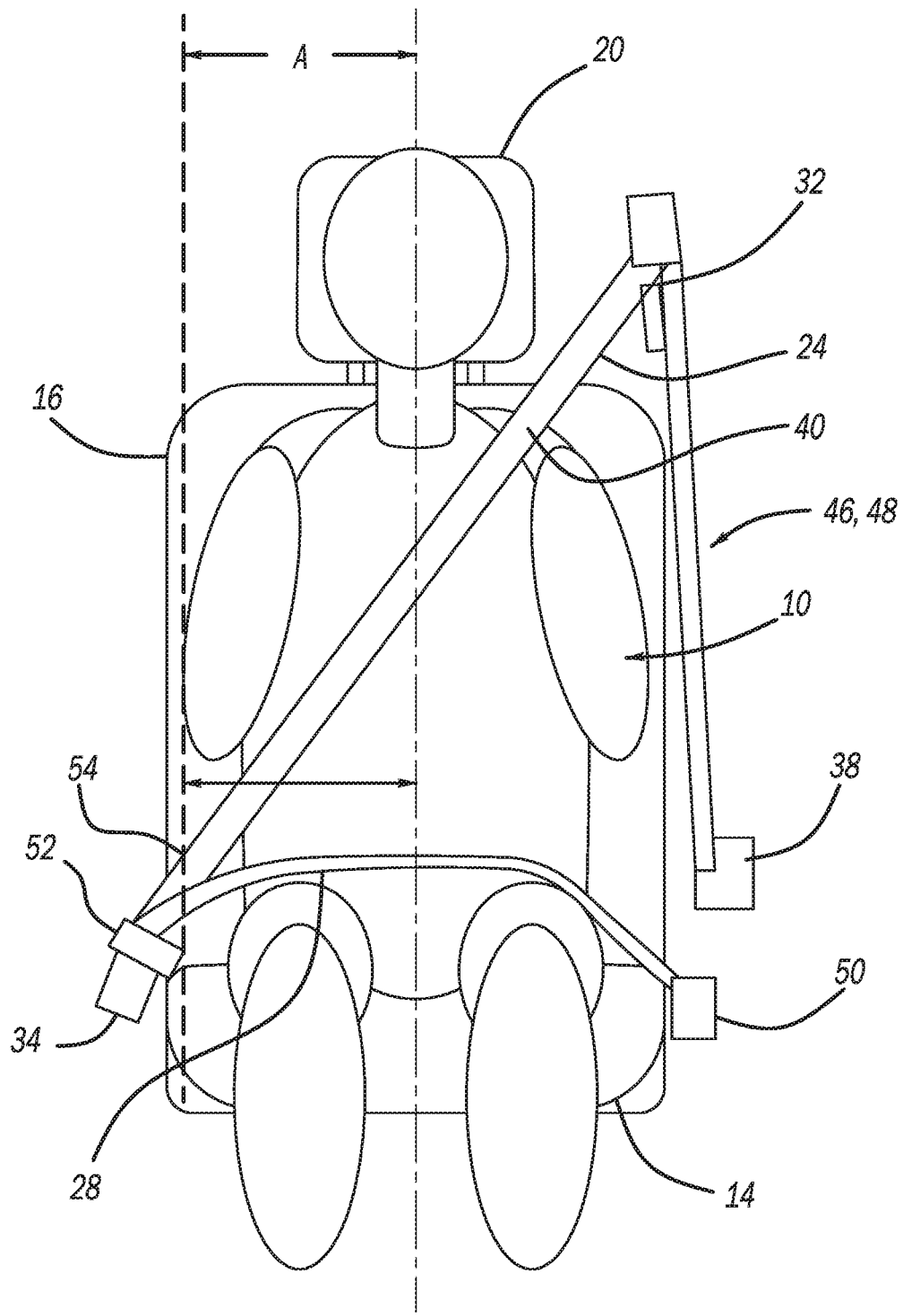
FIG. 2 is a front view of a driver side front seat occupant dummy positioned in a vehicle seat with a fastened three point active restraint system in accordance with first and second embodiments of the present invention providing adaptive positioning, shown prior to deployment of the adaptive positioning features.
Figure 3:
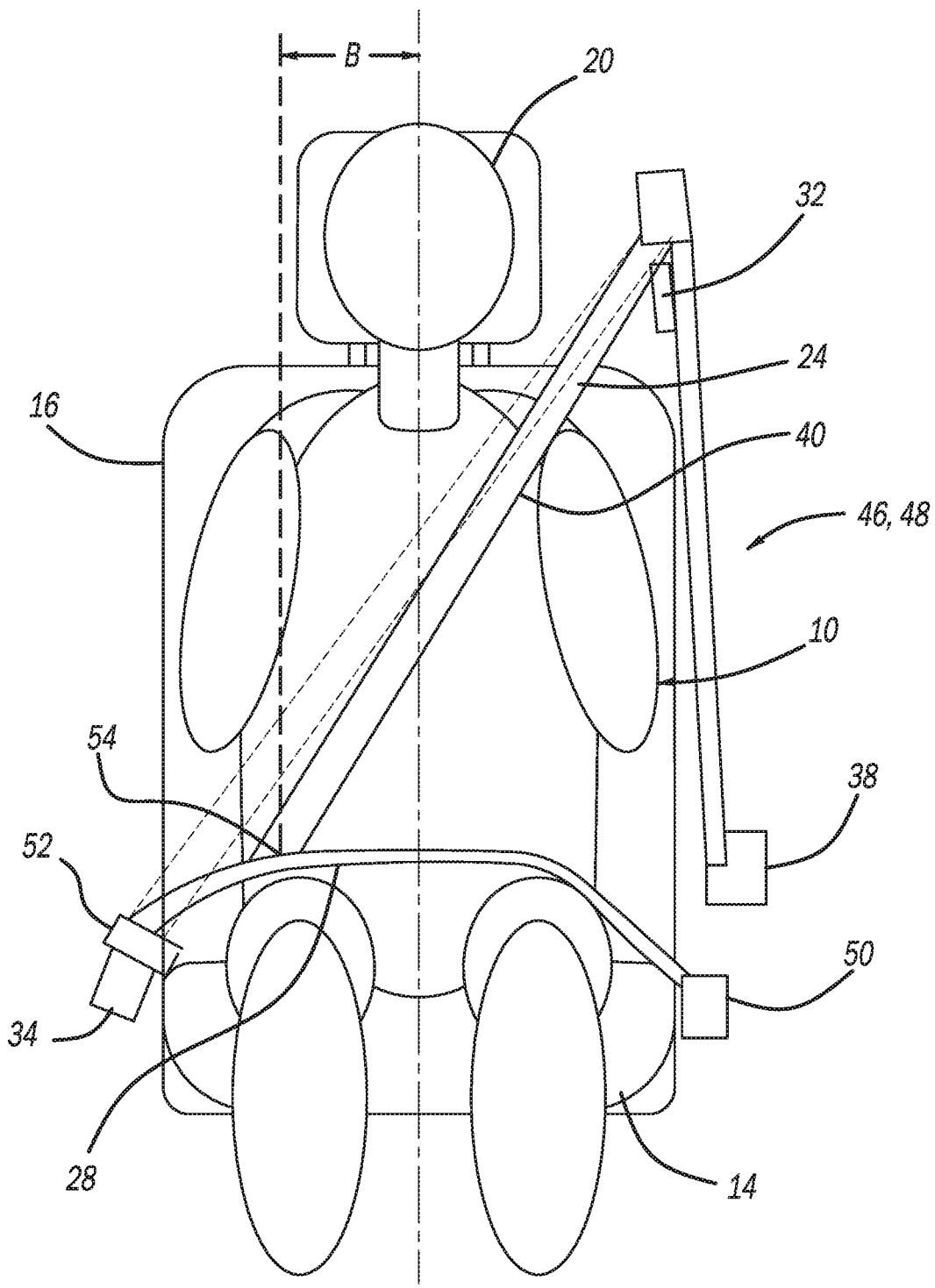
FIG. 3 is a front view of a driver side front seat occupant dummy positioned in a vehicle seat with a fastened three point active restraint system in accordance with first and second embodiments of the present invention providing adaptive positioning shown following deployment of the adaptive positioning features.

FIGS. 2 and 3 illustrate operation of a seatbelt assembly with adaptive positioning in accordance with first and second embodiments of the present invention. Features of these embodiments and further embodiments described below which have common features are designated by like reference numbers and a duplicative description of these elements is unnecessary and is not presented. Seatbelt assemblies 46 and 48 provide a feature referred to herein as "adaptive positioning". FIGS. 2 and 3 differ from the general description of seatbelt assembly 22 described previously in that the system employs two retractors, in addition to retractor 38 described previously, lap retractor 50 is provided. This is consistent with conventional two retractor systems. In this case separation tongue 52 is provided which does not allow webbing 24 to flow through the tongue but instead has ends of lap belt and shoulder belt portions 28 and 40 fixed to the tongue. As shown in FIG. 2, the 6 inch minimum separation required by FMVSS 208 is provided for seatbelt assemblies 46 and 48.

FIG. 2 depicts a normal use condition for seatbelt assembly 46 and 48 prior to a restraint event. FIG. 3 illustrates systems 46 and 48 after a restraint condition occurs in which a tensile load has acted on lap and shoulder belt portions 28 and 40, for example, in response to a frontal impact of the associated vehicle wherein the seatbelt assembly is employed for occupant restraint. The increased tensile load in the belt webbing may result from engagement of the occupant against the webbing and/or tensile resulting from activation of a belt pretensioner occurring before the occupant is restrained by seatbelt assemblies 46 or 48. After such adaptive belt positioning operation, the position of junction 54 between lap belt and shoulder belt portions 28 and 40 shifts inboard toward centerline 42. This provides enhanced engagement with the occupants ASIS, as described previously. FIG. 2 illustrates the lateral separation designated by dimension "A", whereas a decreased dimension "B" after adaptive belt positioning is shown in FIG. 3. The features and operation of components of seatbelt assemblies 46 and 48 which provide such adaptive positioning are described by FIGS. 4-11.

A first embodiment of seatbelt assembly 46 with adaptive positioning is illustrated in more detail in FIGS. 4 and 5. As shown, lap belt portion 28 is fixedly attached to latch plate 56 by folding over webbing 24 and sewing it to itself forming loop 57. As mentioned previously, this is a common arrangement in dual retractor systems. As further shown, shoulder belt webbing 40 is attached to lap belt portion 28 by stitching 58 at junction 54 between lap and shoulder belt portions 28 and 40, which is adjacent to latch plate 56 in the condition illustrated in FIGS. 4 and 5. Lap belt portion 28 is folded over onto itself, in this example forming three layers in folded section 60, best shown in FIG. 5. Folded section 60 is maintained in the condition illustrated in FIG. 5 by tear/tack stitching 62 which provides for normal retention of webbing 24 in the folded condition but, as will be described subsequently, will fail once a predetermined load is exerted on lap belt portion 28.

With reference to FIGS. 6 and 7, seatbelt assembly 46 after adaptive positioning has occurred is illustrated. Once a predetermined tensile load is exerted on lap belt portion 28 due to, for example, a frontal impact condition with the occupant exerting a forward directed load on webbing 24 and/or by operation of a belt pretensioner, tear/tack stitching 62 fails, releasing the webbing and allowing lap belt portion 28 to extend to its full unfolded length without the presence of overlapping of webbing sections at folded section 60. As shown in these figures, lateral separation "B" is then provided as depicted in FIG. 3. Thus the lateral separation changes between dimensions "A" and "B" in response to tensile loads. In preferred embodiments, lap retractor 50 used with seatbelt assembly 46 (and 48 described below) will include a pretensioning function which retracts webbing 24 of lap belt portion 28 in order to prevent excess slack from occurring in the lap belt webbing which can adversely affect restraint performance. The additional effective length of lap belt portion 28 caused by adaptive positioning would be taken in by retractor 50.

Now with reference to FIGS. 8-11, a second embodiment of seatbelt assembly 48 with adaptive positioning will be described. For this embodiment, a modified latch plate 64 is provided which includes provisions for retaining sheer pin 66 or other frangible element. Lap belt portion 28 is provided with a folded section 68, similar to folded section 60 of the prior embodiment. In this case frangible stitching is not provided; instead lap belt portion 28 features loop 70 fixed to sheer pin 66 which is in turn mounted to latch plate 64. FIGS. 8 and 9 illustrates the normal usage condition for seatbelt assembly 48. FIGS. 10 and 11 depict shoulder belt portion 40 after adaptive positioning. Once a tensile load is exerted on lap belt portion 28 exceeding a predetermined level, sheer pin 66 structurally fails to release loop 70, allowing lap belt portion 28 to extend to its full length. As with the prior embodiment, this action allows the lateral separation of junction 54 to decrease from dimension "A" to dimension "B".

In both cases for seatbelt assemblies 46 and 48, the retention features for maintaining folded webbing section 60 and 68 are sufficient to permit normal usage of the seatbelt assembly without causing an extension of the lap belt portion 28 which is intended to occur only when tensile loads of a magnitude encountered in frontal impact conditions are exceeded.

Now turning to FIGS. 12-22, a series of embodiments of seatbelt assemblies are described which do not have adaptive positioning features which respond to restraint loads in the seatbelt assembly. Instead, these embodiments reposition the intersection between the lap and shoulder belt portions 28 and 40 by other mechanisms. In each case there is an extension or displacement of junction 54 between the lap and shoulder belt portions 28 and 40 and buckle 34. The embodiments depicted in these figures are especially adapted for single retractor systems which require that the seatbelt webbing 24 flow through a buckle latch plate or other mechanisms so that the lengths of the lap and shoulder belt portions 28 and 40 can be varied as needed.

Figure 12:
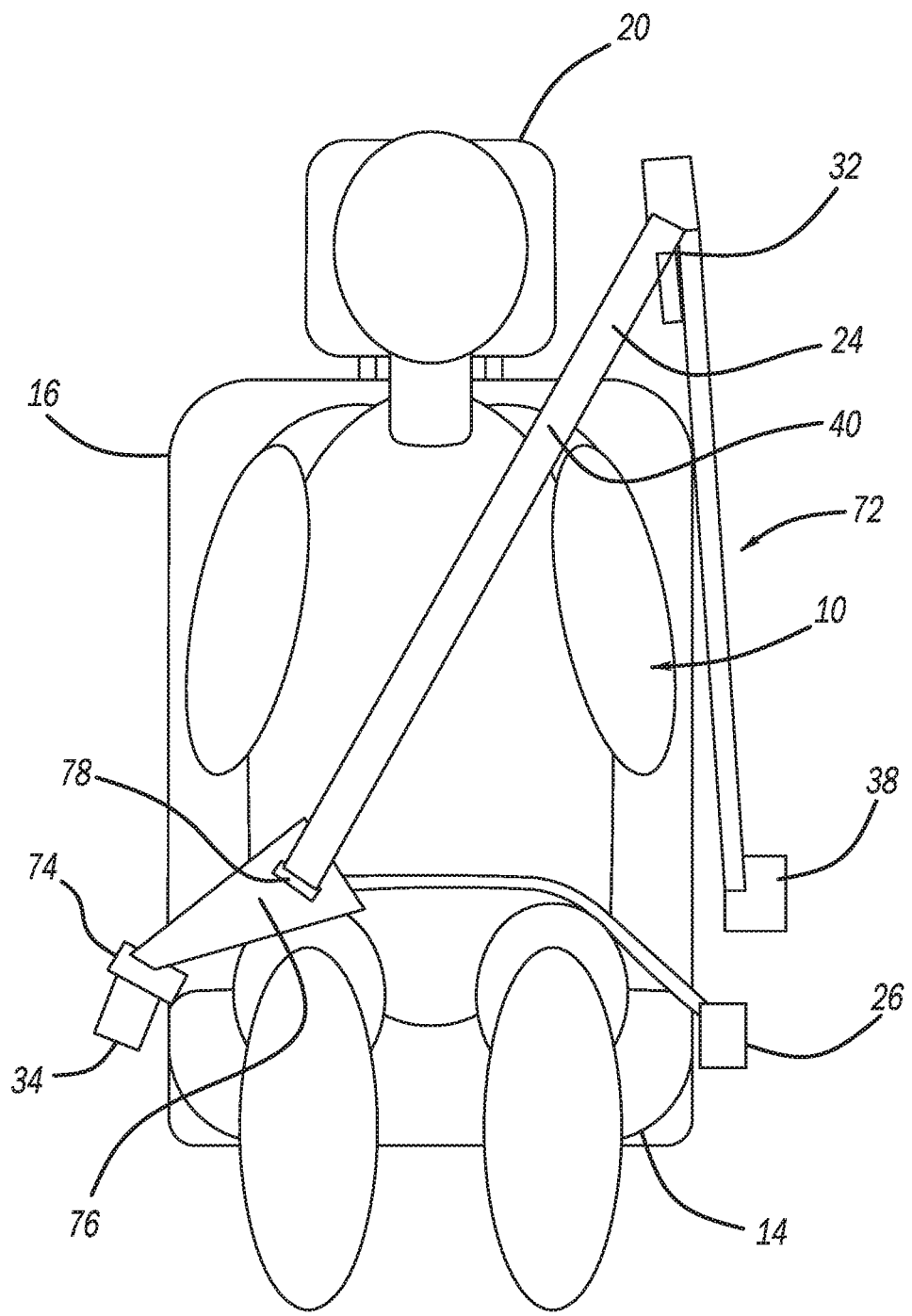
FIG. 12 is a front view of a driver side front seat occupant dummy positioned in a vehicle seat with a fastened three point active restraint system in accordance with a third embodiment of the present invention featuring a belt positioning turning loop.
Figure 13:
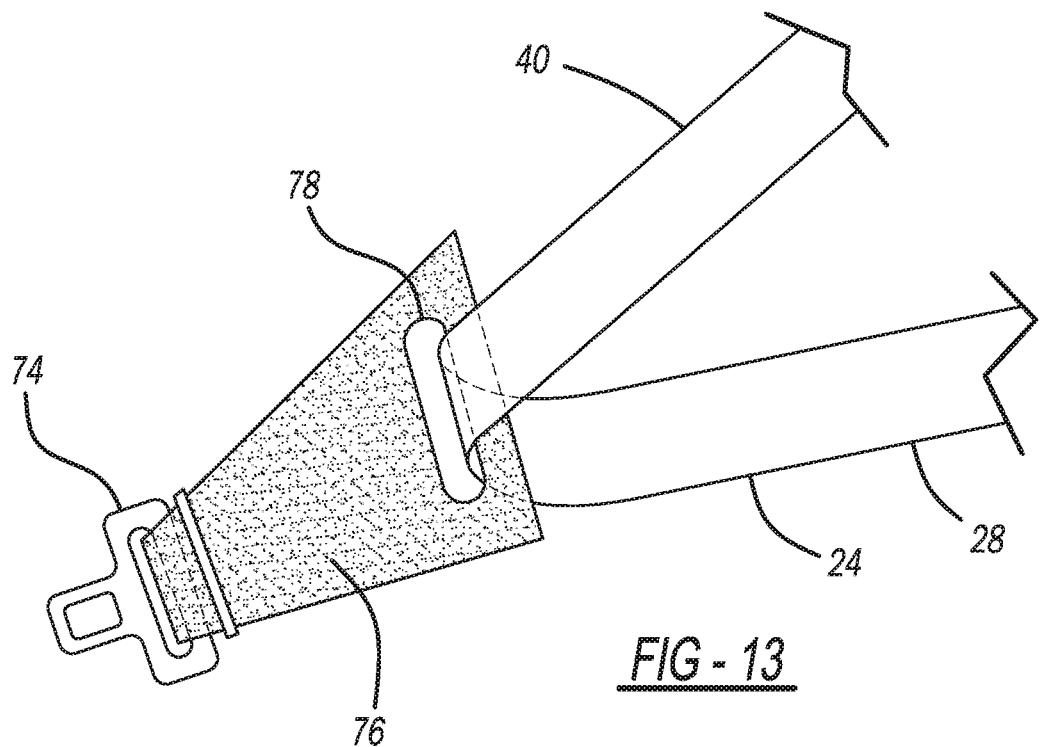
FIG. 13 is an enlarged cutaway view taken from FIG. 12 showing in more detail features of the flexible turning loop.
Figure 14:
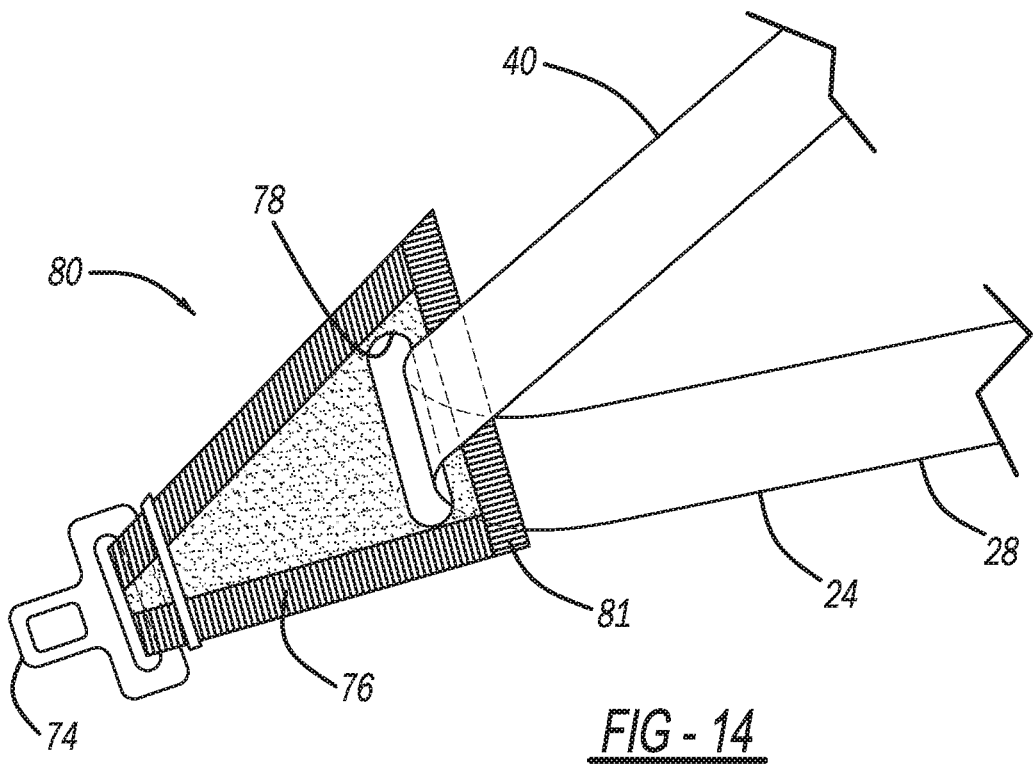
FIG. 14 is an enlarged cutaway view taken from FIG. 12 showing in more detail features of the flexible turning loop in accordance with a fourth embodiment of the present invention.

FIG. 12 illustrates a single retractor seatbelt assembly 72 very similar to the general depiction of FIG. 1. In this third embodiment of the invention, seatbelt assembly 72 includes latch plate 74 having belt positioning turning loop 76 consisting of a heavyweight fabric (or multiple layers of fabric) that is sewn on one end of latch plate 74. At the opposite end of turning loop 76, slot 78 is formed through which the seatbelt webbing 24 passes. The area of turning loop 76 forming slot 78 may be lined or additional features may be provided to facilitate the smooth transfer of webbing through the slot. Flexible turning loop 76 may include reinforcement such as seatbelt webbing 81 tracing around its perimeter to provide the necessary strength and elongation requirements. Such reinforcement is illustrated by the fourth embodiment of seatbelt assembly 80 shown in FIG. 14. Use of systems 72 and 80 is consistent with typical single retractor systems. The occupant is permitted to fasten and unfasten latch plate 74 as desired and slot 78 performs the normal function of a sliding latch plate, allowing the lengths of lap and shoulder belt portions 28 and 40 to be varied. Previously mentioned is the fact that these systems, which are not adaptive and thereby do not change their dimensional characteristics during restraint, will still need to comply with applicable configuration parameters established by safety standards and other specifications. However, the use of turning loop 76 can provide additional design flexibility as to the positioning of buckle assembly 34 relative to seat 12 and centerline 42. Turning loop 76 is shown having a generally isosceles triangular or trapezoidal shaped configuration. Such shapes provide a widened section at slot 78 which serves to provide adequate structure to restrain loads exerted during a restraint event as well as providing a large surface area for reducing contact pressure against the occupant during a restraint event.

Figure 15:
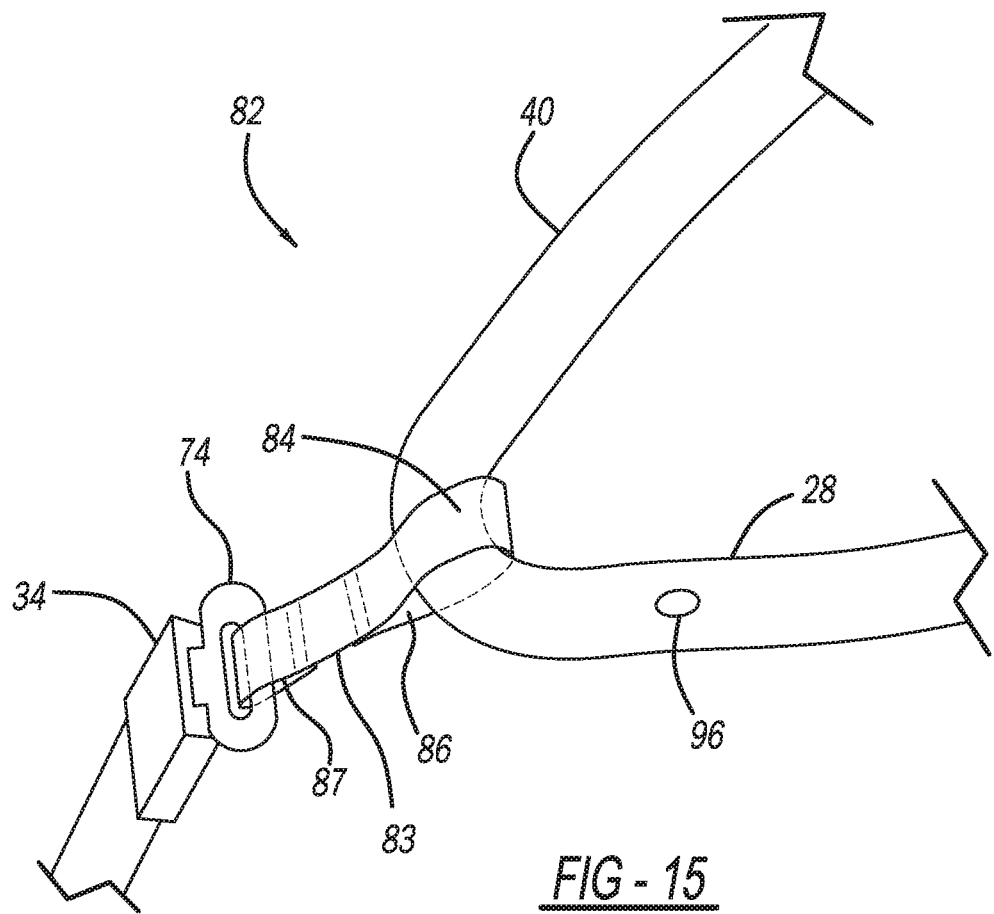
FIG. 15 is an enlarged cutaway similar to FIG. 13 but illustrating a turning loop in accordance with a fifth embodiment of the present invention.
Figure 16:
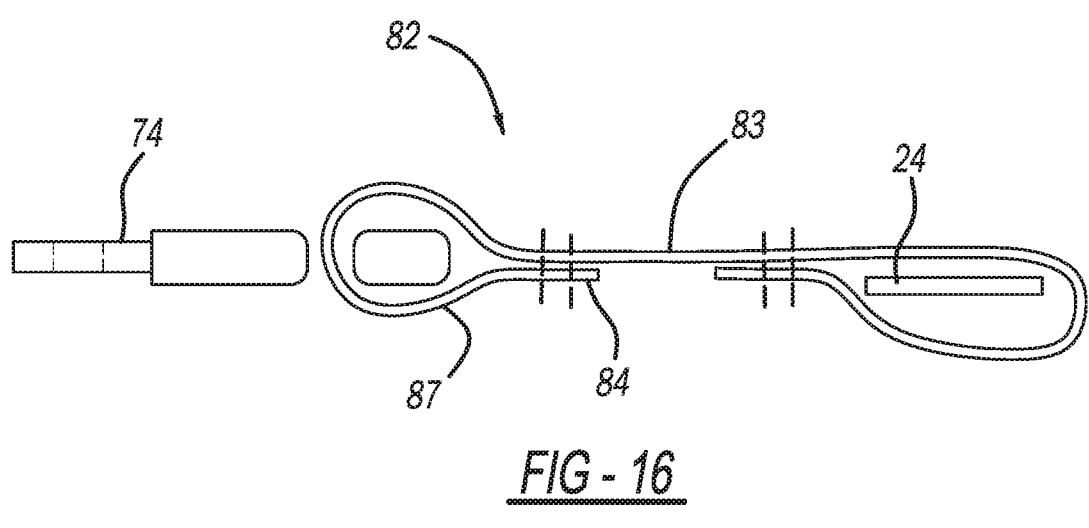
FIG. 16 is a cross-sectional view illustrating a turning loop in accordance with the fifth embodiment of the present invention.

FIGS. 15-18 illustrate additional embodiments for turning loops in accordance with this invention. FIGS. 15 and 16 illustrate seatbelt assembly 82 according to a fifth embodiment employing a simple turning loop 83 formed of a flexible webbing material and forming a webbing looped portion 84 for the flow of webbing forming the lap and shoulder belt sections 28 and 40, and fixed to tongue 74 at loop 87. Enlarged loop opening 86 functioning the same as slot 78, allowing the passage of lap and shoulder belt portions 28 and 40.

Figure 17:
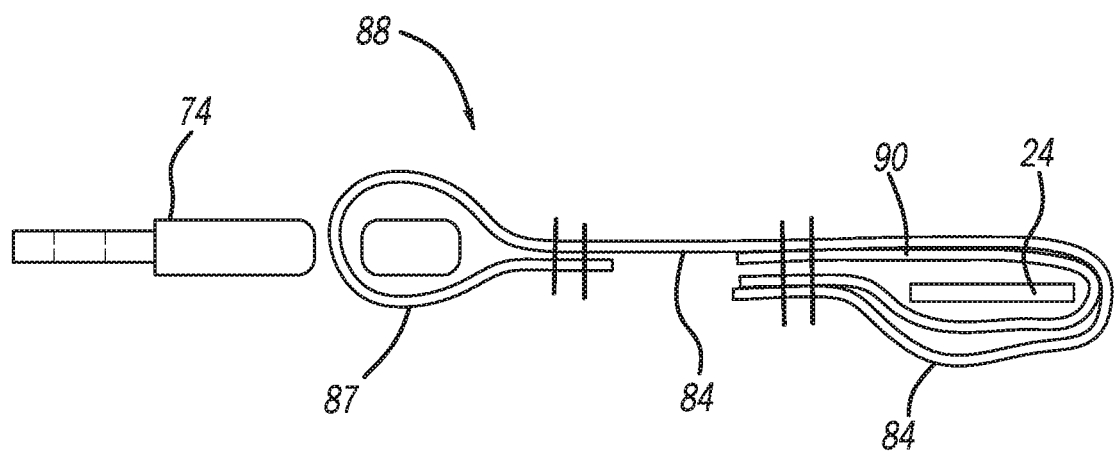
FIG. 17 is a cross-sectional view illustrating a turning loop in accordance with a sixth embodiment of the present invention.

FIG. 17 illustrates seatbelt assembly 88 very similar to assembly 82 except that plastic insert 90 is provided to line the inside of webbing looped portion 84 to reduce friction and facilitate the free flow of webbing through the turning loop.

Figure 18:
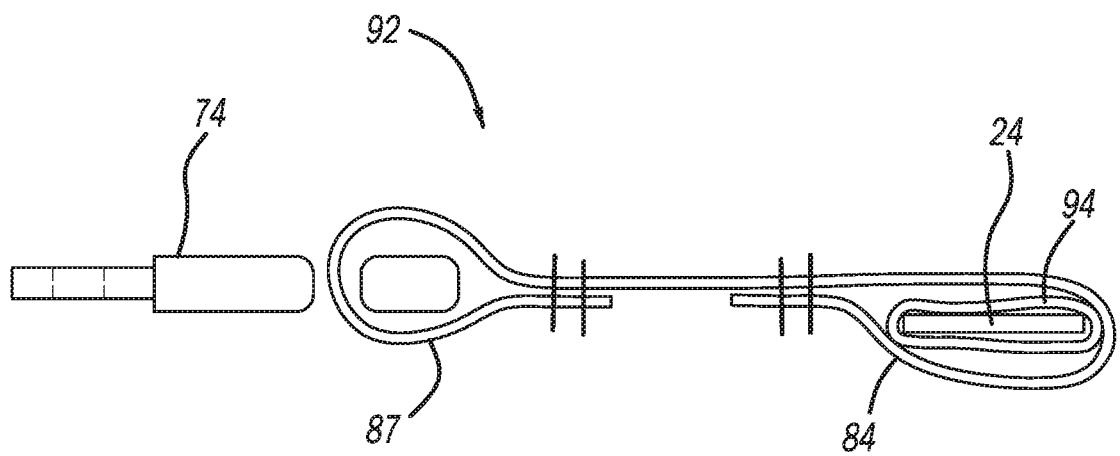
FIG. 18 is a cross-sectional view illustrating a turning loop in accordance with a seventh embodiment of the present invention.

FIG. 18 is a cross-sectional view showing seatbelt assembly 92 very similar to seatbelt assembly 88 with plastic collar 94 sandwiched within webbing looped portion 84 for facilitating the flow of webbing 24 therethrough. For each of these embodiments it may be desirable to provide a web stop button 96 which is a feature commonly found in traditional single retractor seatbelt assemblies for preventing a sliding latch plate from moving out of position for convenient grasping by the occupant to don on the seatbelt system.

FIG. 19 illustrates seatbelt assembly 98 in accordance with the ninth embodiment of the present invention. In this case, turning loop panel 102 very similar to turning loop 76 is provided except the webbing slot is replaced by channel 103 that is created by folding the panel over onto itself to create a looped portion in the fabric. This configuration may also include a plastic insert feature such as shown in the previous figures.

FIG. 20 shows seatbelt assembly 104 similar to the configuration shown in FIG. 15 except that web stop button 96 is replaced by a web stop loop 106. Web stop loop 106 may alternatively consist of a plastic strip to locally increase the thickness and rigidity of webbing 24 to ensure that the turning loop maintain this position on the webbing during stowage and during the initial occupant buckling process. FIGS. 21 and 22 illustrate the stowed position of seatbelt with turning loops 84 and 76 respectively.

While the above description constitutes the preferred embodiment of the present invention, it will be appreciated that the invention is susceptible to modification, variation and change without departing from the proper scope and fair meaning of the accompanying claims.

The invention claimed is:

1. An active seatbelt assembly for restraining an occupant of a motor vehicle comprising,
    a seatbelt buckle adapted to be fixed to the vehicle,
    a lap belt portion and a shoulder belt portion for restraining the occupant, the lap belt portion adapted to extend across the pelvis of the occupant and the shoulder belt portion adapted to extend diagonally across the upper torso of the occupant,
    a latch plate for removable attachment to the buckle, the latch plate coupled with the lap belt portion and the shoulder belt portion, and
    a device for displacing an intersection between the lap and shoulder belt portions from a first longitudinal vertical plane adjacent to the latch plate to a second longitudinal vertical plane toward a longitudinal vertical centerline of the occupant, the device in the form of a flexible turning loop having a first end and a second end uninterruptedly extending from the first end as a single unit,
    wherein the first end affixed to the latch plate and the second end forming a slot adapted for passage of a webbing of the lap and shoulder belt portions such that the webbing of the lap and shoulder belt portions is slidably and irremovably coupled to the turning loop.

2. An active seatbelt assembly in accordance with claim 1 further comprising, the turning loop in the form of a length of a webbing material folded onto itself to form a loop portion, the loop portion forming the slot.

3. An active seatbelt assembly in accordance with claim 2 further comprising, a plastic sheet element folded within the loop portion contacting the webbing for facilitating the flow of the webbing through the slot.

4. An active seatbelt assembly in accordance with claim 2 further comprising, a plastic tubular element retained within the loop portion contacting the webbing for facilitating the flow of the webbing through the slot.

5. An active seatbelt assembly in accordance with claim 1 further comprising, a webbing stop affixed to the webbing to limit the movement of the webbing through the turning loop.

6. An active seatbelt assembly for restraining an occupant of a motor vehicle comprising,
    a seatbelt buckle adapted to be fixed to the vehicle,
    a lap belt portion and a shoulder belt portion for restraining the occupant, the lap belt portion adapted to extend across the pelvis of the occupant and the shoulder belt portion adapted to extend diagonally across the upper torso of the occupant,
    a latch plate for removable attachment to the buckle, and
    a device for displacing an intersection between the lap and shoulder belt portions from a first longitudinal vertical plane adjacent to the buckle to a second longitudinal vertical plane toward a longitudinal vertical centerline of the occupant, the device in the form of a turning loop formed of a flexible material having a first end affixed to the latch plate and a second end displaced from the first end forming a slot for passage of a webbing of the lap and shoulder belt portions, the turning loop having generally an isosceles triangle or a rhomboid shape having a width at a connection at the latch plate less than a width at the slot.

7. An active seatbelt assembly for restraining an occupant of a motor vehicle comprising,
    a seatbelt buckle adapted to be fixed to the vehicle,
    a seatbelt webbing defining a lap belt portion and a shoulder belt portion for restraining the occupant, the lap belt portion adapted to extend across the pelvis of the occupant and the shoulder belt portion adapted to extend diagonally across the upper torso of the occupant,
    a latch plate for removable attachment to the buckle,
    a flexible turning loop formed of a flexible material having a first end and a second end uninterruptedly extending from the first end as a single unit, the first end affixed to the latch plate, and the second end forming a slot allowing passage of the seatbelt webbing and delineating the lap and shoulder belt portions such that the webbing of the lap and shoulder belt portions is slidably and irremovably coupled to the turning loop, and
    a point of intersection between the lap and shoulder belt portions at a first longitudinal vertical plane at the latch plate displaced to a second longitudinal vertical plane toward a longitudinal vertical centerline of the occupant.

8. An active seatbelt assembly in accordance with claim 7 further comprising, the turning loop in the form of a length of a webbing material folded onto itself to form a looped portion, the looped portion forming the slot.

9. An active seatbelt assembly in accordance with claim 8 further comprising, a plastic sheet element folded within the looped portion contacting the webbing for facilitating the flow of the webbing through the slot.

10. An active seatbelt assembly in accordance with claim 8 further comprising, a plastic tubular element retained within the looped portion contacting the webbing for facilitating the flow of the webbing through the slot.

11. An active seatbelt assembly in accordance with claim 8 further comprising, a webbing stop affixed to the webbing to limit the movement of the webbing through the slot.

12. An active seatbelt assembly for restraining an occupant of a motor vehicle comprising,
   a seatbelt buckle adapted to be fixed to the vehicle,
   a seatbelt webbing defining a lap belt portion and a shoulder belt portion for restraining the occupant, the lap belt portion adapted to extend across the pelvis of the occupant and the shoulder belt portion adapted to extend diagonally across the upper torso of the occupant,
   a latch plate for removable attachment to the buckle,
   a turning loop formed of a flexible material affixed at a first end to the latch plate and having a second end forming a slot allowing passage of the seatbelt webbing and delineating the lap and shoulder belt portions, and
   a point of intersection between the lap and shoulder belt portions at a first longitudinal vertical plane at the buckle displaced to a second longitudinal vertical plane toward a longitudinal vertical centerline of the occupant, the turning loop having generally an isosceles triangle or a rhomboid shape having a width at a connection at the latch plate less than a width at the slot.

* * * * *